(12) United States Patent
Sivaraman

(10) Patent No.: US 12,325,526 B2
(45) Date of Patent: Jun. 10, 2025

(54) EVACUATION INFLATABLE FORMED OF NANO-FIBER MATERIAL

(71) Applicant: GOODRICH CORPORATION, Charlotte, NC (US)

(72) Inventor: Rajamanikandan Sivaraman, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 320 days.

(21) Appl. No.: 17/870,315

(22) Filed: Jul. 21, 2022

(65) Prior Publication Data

US 2023/0348076 A1    Nov. 2, 2023

(30) Foreign Application Priority Data

May 2, 2022    (IN) .............. 202241025540

(51) Int. Cl.
*B64D 25/14*    (2006.01)
*B64D 25/18*    (2006.01)
(Continued)

(52) U.S. Cl.
CPC ............. *B64D 25/14* (2013.01); *B64D 25/18* (2013.01); *D03D 1/02* (2013.01); *D03D 15/283* (2021.01); *D03D 15/33* (2021.01); *D06M 15/564* (2013.01); *D06M 2101/32* (2013.01); *D06M 2101/34* (2013.01); *D06M 2101/36* (2013.01);
(Continued)

(58) Field of Classification Search
CPC .............. B64D 25/14; B64D 25/18; B32B 2264/1023; B32B 2264/1022; B32B 2264/1021; B32B 5/024; B32B 27/12; B32B 2250/03; B32B 2262/0261; B32B 2262/0269; B32B 2262/0292; B32B 2264/108; D03D 15/283; D03D 1/02; D06M 2101/32; D06M 2101/34; D06M 2101/36; D06M 2101/38; D06N 3/0002; D06N 3/0006; D06N 3/0011; D06N 3/0027; D06N 3/0034; D06N 3/0088; D06N 3/009; D06N 3/14; D06N 3/145; D06N 3/186;
(Continued)

(56) References Cited

U.S. PATENT DOCUMENTS 8,663,762 B2    3/2014  Mazany et al.
9,527,249 B1   12/2016  Duggal et al.
(Continued)

FOREIGN PATENT DOCUMENTS

KR    20090030727    3/2009

OTHER PUBLICATIONS

European Patent Office, European Search Report dated Aug. 28, 2023 in Application No. 23169885.3.

*Primary Examiner* — Camie S Thompson
(74) *Attorney, Agent, or Firm* — SNELL & WILMER L.L.P.

(57) ABSTRACT

An inflatable for an evacuation system may comprise a nano-fiber material defining an inflation chamber. The nano-fiber material may include a nano-fiber fabric formed of woven nano-fibers, an interior thermoplastic polymeric coating formed over a first side of the nano-fiber fabric and oriented toward the inflation chamber, and an exterior thermoplastic polymeric coating formed over a second side of the nano-fiber fabric and oriented away from the inflation chamber.

15 Claims, 3 Drawing Sheets

(51) Int. Cl.
  *D03D 1/02* (2006.01)
  *D03D 15/283* (2021.01)
  *D03D 15/33* (2021.01)
  *D06M 15/564* (2006.01)
  *D06M 101/32* (2006.01)
  *D06M 101/34* (2006.01)
  *D06M 101/36* (2006.01)
  *D06M 101/38* (2006.01)

(52) U.S. Cl.
  CPC ..... *D06M 2101/38* (2013.01); *D10B 2331/02* (2013.01); *D10B 2331/021* (2013.01); *D10B 2331/04* (2013.01); *D10B 2331/10* (2013.01)

(58) Field of Classification Search
  CPC .......... D10B 2331/02; D10B 2331/021; D10B 2331/04; D10B 2331/10
  See application file for complete search history.

(56) References Cited

U.S. PATENT DOCUMENTS

2014/0134354 A1* 5/2014 Mazany ............... D06N 3/0063
 442/72
2017/0174298 A1 6/2017 Duggal

* cited by examiner

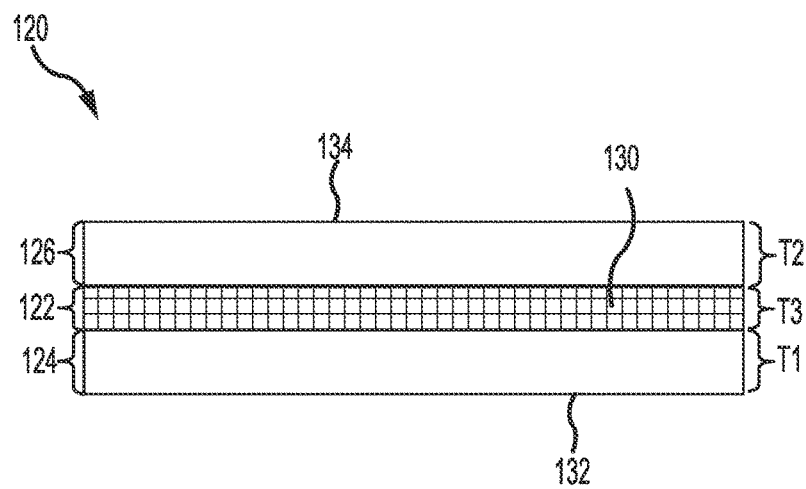
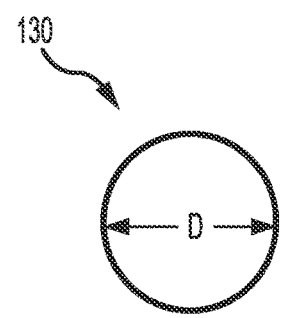
FIG. 3A  FIG. 3B
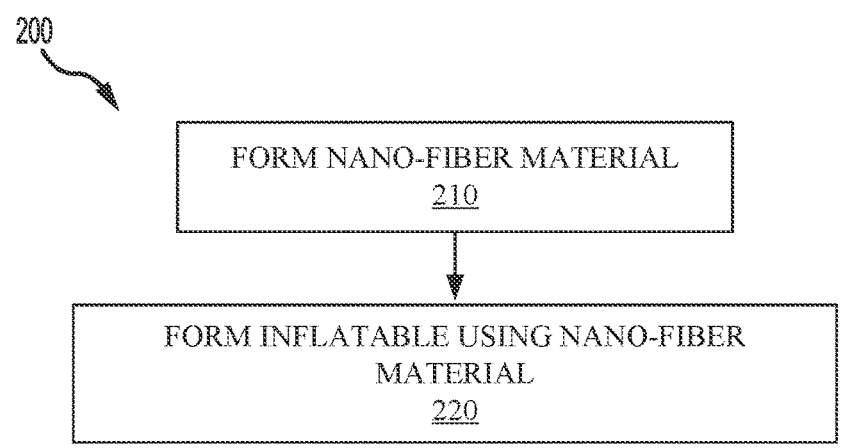
FIG. 4A

EVACUATION INFLATABLE FORMED OF NANO-FIBER MATERIAL

CROSS-REFERENCE TO RELATED APPLICATIONS

This application claims priority to, and the benefit of, India Provisional Patent Application No. 202241025540, filed May 2, 2022 (DAS Code 5E6D) and titled "EVACUATION INFLATABLE FORMED OF NANO-FIBER MATERIAL," which is incorporated by reference herein in its entirety for all purposes.

FIELD

The present disclosure relates to aircraft evacuation systems and, in particular, to evacuation inflatables, such as evacuation slides and life rafts, formed of nano-fiber materials.

BACKGROUND

Emergency evacuation systems may be used to exit an aircraft absent a jet way or other suitable means of egress for passengers. The evacuation systems generally include an inflatable such as an inflatable slide and/or an inflatable life raft. Current inflatables are generally formed of polymer coated fabrics. These polymer coated fabric typically include a woven base cloth sandwiched between polyurethane polymer coatings. The base cloth accounts for between 50% and 60% of an overall weight of the inflatable.

SUMMARY

A nano-fiber material for an inflatable of an evacuation system is disclosed herein. In accordance with various embodiments, the nano-fiber material may comprise a nano-fiber fabric formed of a woven nano-fiber, an interior thermoplastic polymeric coating formed over a first side of the nano-fiber fabric, and an exterior thermoplastic polymeric coating formed over a second side of the nano-fiber fabric.

In various embodiments, the nano-fiber fabric is a woven fabric layer comprising at least one ply of the woven nano-fiber. In various embodiments, the woven nano-fiber comprises at least one of a polyamide nano-fiber, a polyaramid nano-fiber, a polyurethane nano-fiber, or a polyester nano-fiber. In various embodiments, the woven nano-fiber comprises a Poly(hexamethylene adipamide) nano-fiber.

In various embodiments, the woven nano-fiber comprises a plurality of nano-sized filler particles. In various embodiments, the plurality of nano-sized filler particles includes at least one of silica, boron nitride, boron carbide, graphene, titanium oxide, zinc oxide, or alumina.

In various embodiments, the nano-fiber fabric forms between 45% and 65% of a total weight of the nano-fiber material.

An inflatable for an evacuation system is also disclosed herein. In accordance with various embodiments, the inflatable may comprise a nano-fiber material defining an inflation chamber. The nano-fiber material may comprise a nano-fiber fabric comprised of a woven nano-fiber, an interior thermoplastic polymeric coating formed over a first side of the nano-fiber fabric and oriented toward the inflation chamber, and an exterior thermoplastic polymeric coating formed over a second side of the nano-fiber fabric and oriented away from the inflation chamber.

In various embodiments, the nano-fiber fabric is a woven fabric layer comprising at least one ply of the woven nano-fiber. In various embodiments, the woven nano-fiber comprises a plurality of nano-sized filler particles. In various embodiments, the plurality of nano-sized filler particles includes at least one of silica, boron nitride, boron carbide, graphene, titanium oxide, zinc oxide, or alumina.

In various embodiments, the nano-fiber fabric has a thickness between 75 micrometers and 100 micrometers. In various embodiments, a ratio of a thickness of the nano-fiber fabric to a thickness of the interior thermoplastic polymeric coating is between 1 to 1 and 2 to 1.

In various embodiments, the nano-fiber fabric forms between 45% and 65% of a total weight of the nano-fiber material. In various embodiments, the interior thermoplastic polymeric coating forms between 25% and 35% of the total weight of the nano-fiber material.

A method of forming an inflatable for an evacuation system is also disclosed herein. In accordance with various embodiments, the method may comprise the steps of forming a nano-fiber material and forming an inflatable chamber of the inflatable using the nano-fiber material. The nano-fiber material may be formed by forming a nano-fiber yarn, weaving the nano-fiber yarn to form a nano-fiber fabric, depositing a first thermoplastic polymeric coating over a first side of the nano-fiber fabric, and depositing a second thermoplastic polymeric coating over a second side of the nano-fiber fabric.

In various embodiments, forming the nano-fiber material further comprises forming the nano-fiber yarn including nano-sized filler particles, where the nano-sized filler particles include at least one of silica, boron nitride, boron carbide, graphene, titanium oxide, zinc oxide, or alumina.

In various embodiments, forming the nano-fiber material further comprises depositing the first thermoplastic polymeric coating such that a ratio of a thickness of the nano-fiber fabric to a thickness of the first thermoplastic polymeric coating is between 1 to 1 and 2 to 1.

In various embodiments, the nano-fiber fabric forms between 45% and 65% of a total weight of the nano-fiber material. In various embodiments, the interior thermoplastic polymeric coating forms between 25% and 35% of the total weight of the nano-fiber material.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3A illustrates a cross-section view of a nano-fiber material of an evacuation system inflatable, in accordance with various embodiments;

FIG. 3B illustrates a nano-fiber of the nano-fiber material of FIG. 3A, in accordance with various embodiments; and FIGS. 4A and 4B illustrate flow charts for a method of forming an inflatable using nano-fiber material, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface lines may be used throughout the figures to denote different parts but not necessarily to denote the same or different materials.

Throughout the present disclosure, like reference numbers denote like elements. Accordingly, elements with like element numbering may be shown in the figures but may not necessarily be repeated herein for the sake of clarity. As used herein, "proximate" refers to a direction towards or a location closer to a reference component.

Evacuation systems of the present disclosure include an inflatable (e.g., an inflatable slide or life raft) formed using nano-fiber fabric. The fabric comprises, in various embodiments, thermoplastic polyurethane coatings bonded to opposing sides of a woven nano-fiber fabric. Inflatables formed from the nano-fiber fabric disclosed herein may be lighter weight than conventional non-nano fiber inflatables due to the smaller volume and/or decreased weight of the nano-fiber fabric. In various embodiments, the nano-fibers may be integrated with nano-fillers to tailor one or more characteristics (e.g., strength, heat resistance, resistance to stretching, etc.) of the nano-fiber material. The decreased weight of the nano-fiber fabric may also allow for increased volumes of thermoplastic coating and/or thermoplastic coatings having more additives. Increased coating volume and/or coating additives may better support machine assisted bonding technologies, which are employed for inflatable bonding, and may increase the reliability and strength of materials bonded to the inflatable.

Figure 1:
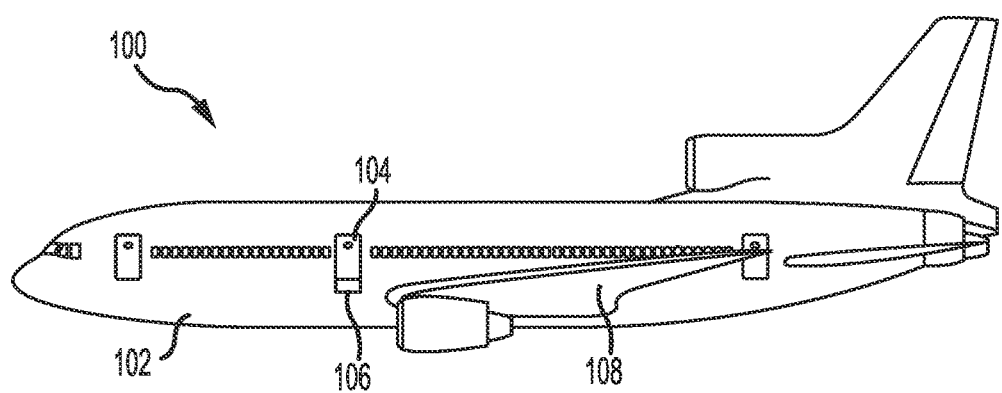
FIG. 1 illustrates an aircraft having an evacuation system, in accordance with various embodiments.

Referring now to FIG. 1, an aircraft 100 is shown. Aircraft 100 may include a fuselage 102 having plurality of exit doors, including an exit door 104. Aircraft 100 may include one or more evacuation systems positioned near a corresponding exit door. For example, aircraft 100 includes an evacuation system 106 positioned near exit door 104. In the event of an emergency, exit door 104 may be opened by a passenger or crew member of aircraft 100. In various embodiments, evacuation system 106 may deploy in response to exit door 104 being opened. Evacuation system 106 may also deploy in response to another action taken by a passenger or crew member such as, for example, depression of a button or actuation of a lever. While evacuation system 106 is disclosed as deploying from exit door 104, it is further contemplated and understood that evacuation system 106 may deploy from other locations. For example, evacuation system 106 may deploy from over a wing 108 of aircraft 100.

Figure 2:
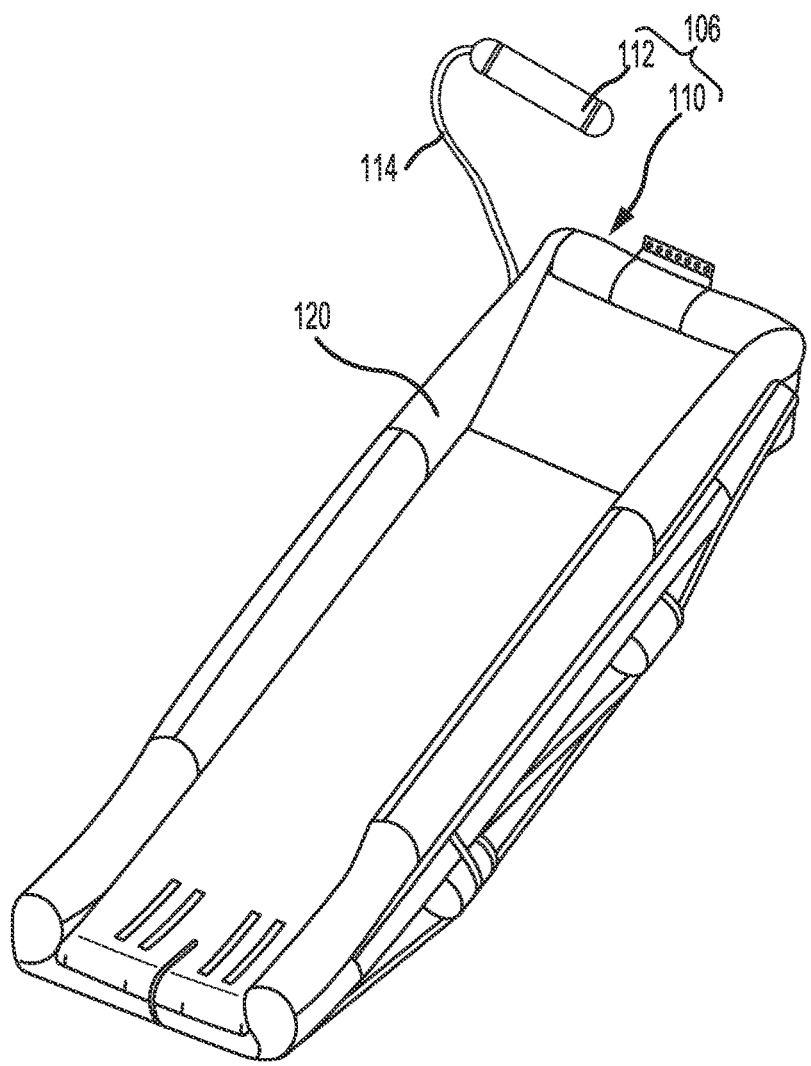
FIG. 2 illustrates a perspective view of an inflatable slide formed of a nano-fiber material, in accordance with various embodiments.

With reference to FIG. 2, additional details of evacuation system 106 are illustrated. In accordance with various embodiments. Evacuation system 106 includes an inflatable 110 and a compressed fluid source 112. Compressed fluid source 112 is fluidly coupled to inflatable 110 via a conduit 114. Compressed fluid source 112 is configured to provide a pressurized gas to inflate inflatable 110. In accordance with various embodiments, inflatable 110 is formed of a nano-fiber material 120. Nano-fiber material 120 defines one or more inflatable chambers configured to receive and retain fluid from compressed fluid source 112 during deployment of inflatable 110. In this regard, nano-fiber material 120 defines the inflatable volume, or inflatable structures, of inflatable 110. In various embodiments, inflatable 110 is an evacuation slide, which may be deployed from an aircraft, such as aircraft 100 in FIG. 1. While FIG. 2 illustrates inflatable 110 as an evacuation slide, it is contemplated and understood that the nano-fiber materials disclosed herein may be used to form other evacuation system inflatables, such as life rafts.

With reference to FIG. 3A, a cross-section view of nano-fiber material 120 is illustrated. In accordance with various embodiments, nano-fiber material 120 includes a nano-fiber fabric 122, an interior thermoplastic polymeric coating 124, and an exterior thermoplastic polymeric coating 126. Nano-fiber fabric 122 is located between interior thermoplastic polymeric coating 124 and exterior thermoplastic polymeric coating 126. Interior thermoplastic polymeric coating 124 may be oriented toward the interior of the inflatable chamber. Exterior thermoplastic polymeric coating 126 may be oriented away from the inflatable chamber. Interior thermoplastic polymeric coating 124 and exterior thermoplastic polymeric coating 126 form gas impermeable layers over opposing sides of nano-fiber fabric 122. In accordance with various embodiments, nano-fiber fabric 122 is a woven fabric layer. For example, nano-fiber fabric 122 comprises one or more layer(s) (or plies) of woven nano-fibers 130. In this regard, nano-fibers 130 may be formed into nano-fiber yarn using electrospinning, or any other suitable process. The nano-fiber yarn is then woven to form nano-fiber fabric 122 (e.g., nano-fiber yarns form the warp and the weft of nano-fiber fabric 122). In various embodiments, nano-fiber fabric 122 may include a single layer (i.e., ply) of woven nano-fibers 130. In various embodiments, nano-fiber fabric 122 may include multiples layers (plies) of woven nano-fibers 130.

FIG. 3B illustrates a cross-section of a nano-fiber 130. Nano-fiber 130 has a diameter D between 1.0 nanometers (nm) and 1000.0 nm. In various embodiments, diameter D may be between 1.0 nm and 500 nm. In various embodiments, diameter D may be between 1.0 nm and 100 nm. Nano-fiber 130 may be a polyamide nano-fiber (e.g., Poly (hexamethylene adipamide), also known as Nylon 66, or polycaprolactam, also known as Nylon 6), polyaramid nano-fiber, polyurethane nano-fiber, and/or polyester nano-fiber.

Nano-fibers 130 formed of polyamide nano-fibers and/or polyester nano-fibers tend to exhibit a strength and resistance to stretching similar to more expensive materials such as ultra-high-molecular-weight polyethylene (UHMWPE). In this regard, using polyamide nano-fibers and/or polyester nano-fibers to form nano-fiber fabric 122 may save costs while meeting the strength, stretch resistance, and other properties associated more costly materials. In various embodiments, nano-fiber 130 may be an UHMWPE fiber.

In various embodiments, nano-fiber 130 may be formed having one or more nano-sized fillers to enhance one or more properties of the nano-fiber fabric 122. For example, the fillers may improve and/or increase a strength, heat resistance, stretch and elongation resistance, air retention, puncture resistance, flame resistance, fungus resistance, UV resistance, electrical conductivity, and/or any other property that may benefit the evacuation slide. For example, nano-fiber 130 may include nano-sized ceramic or other particles. In various embodiments, nano-fiber 130 may be formed including nano-sized particles of silica, boron nitride, boron carbide, graphene, titanium oxide, zinc oxide, alumina, or combinations thereof.

Returning to FIG. 3A, interior thermoplastic polymeric coating 124 and exterior thermoplastic polymeric coating 126 are each bonded to nano-fiber fabric 122. In various embodiments, interior thermoplastic polymeric coating 124 may comprise thermoplastic polyurethane. In various embodiments, exterior thermoplastic polymeric coating 126 may comprise aluminized thermoplastic polyurethane. In various embodiments, interior thermoplastic polymeric coating 124 and exterior thermoplastic polymeric coating 126 are each extruded and then applied, in a hot molten state, to nano-fiber fabric 122 (e.g., the thermoplastic polymeric material goes directly from the extrusion dies onto the fabric layer). In various embodiments, interior thermoplastic polymeric coating 124 and exterior thermoplastic polymeric coating 126 are each bonded to nano-fiber fabric 122 via adhesive lamination. Interior thermoplastic polymeric coating 124 and exterior thermoplastic polymeric coating 126 may also be applied using other solution-based application techniques such as, for example, dipping, spraying, brushing. In this regard, interior thermoplastic polymeric coating 124 and exterior thermoplastic polymeric coating 126 may be formed over nano-fiber fabric 122 using any suitable application technique(s).

In accordance with various embodiments, interior thermoplastic polymeric coating 124 has thickness T1 and exterior thermoplastic polymeric coating 126 has a thickness T2. Thickness T1 is measured between nano-fiber fabric 122 and the interior surface 132 formed by interior thermoplastic polymeric coating 124. Interior surface 132 is oriented toward the interior of the inflatable chamber and away from nano-fiber fabric 122. Interior surface 132 defines the inflatable chamber). Thickness T2 is measured between nano-fiber fabric 122 and the exterior surface 134 formed by exterior thermoplastic polymeric coating 124. Exterior surface 134 is oriented away from thermoplastic polymeric coating 124 and nano-fiber fabric 122 (e.g., away from the interior of the inflatable chamber. Exterior surface 134 forms the exterior surface of the inflatable. Nano-fiber fabric 122 has a thickness T3. Thickness T3 is measured between interior thermoplastic polymeric coating 124 and exterior thermoplastic polymeric coating 126.

In various embodiments, thickness T1 of interior thermoplastic polymeric coating 124 may be between 25 micrometers (μm) and 250 μm. In various embodiments, thickness T1 of interior thermoplastic polymeric coating 124 may be between 50 μm and 100 μm. In various embodiments, thickness T1 of interior thermoplastic polymeric coating 124 may be between 50 μm and 75 μm. In various embodiments, thickness T2 of exterior thermoplastic polymeric coating 126 may be between 5 μm and 100 μm. In various embodiments, thickness T2 of interior thermoplastic polymeric coating 126 may be between 10 μm and 50 μm. In various embodiments, thickness T2 of interior thermoplastic polymeric coating 126 may be between 20 μm and 30 μm. The ratio of T1 to T2 may between 4:1 and 1.5:1 or between 3:1 and 2:1. In various embodiments, thickness T3 of nano-fiber fabric 122 may be between 50 μm and 400 μm. In various embodiments, thickness T3 of nano-fiber fabric 122 may be between 75 μm and 200 μm. In various embodiments, thickness T3 of nano-fiber fabric 122 may be between 75 μm and 100 μm. In various embodiments, a ratio of the thickness T3 of nano-fiber fabric 122 to the thickness T1 of interior thermoplastic polymeric coating 124 may be between 1:1 and 2:1. In various embodiments, a ratio of the thickness T3 of nano-fiber fabric 122 to the thickness T1 of interior thermoplastic polymeric coating 124 may be between 3:2 and 2:1. In various embodiments, a ratio of the thickness T3 of nano-fiber fabric 122 to the thickness T1 of interior thermoplastic polymeric coating 124 may be between 4:3 and 2:1. In various embodiments, a ratio of the thickness T3 of nano-fiber fabric 122 to the thickness T1 of interior thermoplastic polymeric coating 124 may be between 4:3 and 3:2.

In various embodiments, nano-fiber material 120 may have a weight between 70 grams per square meter (GSM) and 200 GSM. In various embodiments, nano-fiber material 120 may have a weight between 100 GSM and 175 GSM. In various embodiments, nano-fiber material 120 may have a weight between 110 GSM and 160 GSM. In various embodiments, nano-fiber fabric 122 forms between 40 GSM and 100 GSM of the weight of nano-fiber material 120. In various embodiments, nano-fiber fabric 122 forms between 50 GSM and 90 GSM of the weight of nano-fiber material 120. In various embodiments, nano-fiber fabric 122 forms between 60 GSM and 80 GSM of weight of nano-fiber material 120. Stated differently, nano-fiber fabric 122 may form between 35% and 75%, between 45% and 65%, or between 50% and 55% of a total weight of nan-fiber material 120.

In various embodiments, interior thermoplastic polymeric coating 124 forms between 10 GSM and 75 GSM of the weight of nano-fiber material 120. In various embodiments, interior thermoplastic polymeric coating 124 forms between 20 GSM and 60 GSM of the weight of nano-fiber material 120. In various embodiments, interior thermoplastic polymeric coating 124 forms between 30 GSM and 50 GSM of the weight of nano-fiber material 120. Stated differently, interior thermoplastic polymeric coating 124 may form between 18% and 45%, between 25% and 35%, or between 27% and 32% of a total weight of nan-fiber material 120.

In various embodiments, exterior thermoplastic polymeric coating 126 forms between 5 GSM and 50 GSM of the weight of nano-fiber material 120. In various embodiments, exterior thermoplastic polymeric coating 125 forms between 10 GSM and 40 GSM of the weight of nano-fiber material 120. In various embodiments, exterior thermoplastic polymeric coating 126 forms between 20 GSM and 30 GSM of the weight of nano-fiber material 120. Stated differently, exterior thermoplastic polymeric coating 126 may form between 10% and 30%, between 18% and 27%, or between 20% and 25% of a total weight of nan-fiber material 120.

In various embodiments, interior thermoplastic polymeric coating 124 and/or exterior thermoplastic polymeric coating 126 may include one or more additives configured to improve and/or increase a strength, heat resistance, stretch and elongation resistance, air retention (e.g., air impermeability), puncture resistance, flame resistance, fungus resistance, UV resistance, electrical conductivity, and/or any other property that may benefit the evacuation slide. The decreased size and weight of the nano-fiber fabric 122, as compared to larger, non-nanofiber fabrics, decreases the size weight of nano-fiber material 120, as compared to current the materials used to form current inflatable. The decreased size and weight of the nano-fiber fabric 122, as compared to larger, non-nanofiber fabrics, may also allow for a greater thickness of interior thermoplastic polymeric coating 124 and/or exterior thermoplastic polymeric coating 126 and/or for a greater amount of additives in interior thermoplastic polymeric coating 124 and/or exterior thermoplastic polymeric coating 126 to be employed. Increased coating thickness and/or coating additives may better support machine assisted bonding technologies, which are employed for inflatable bonding, and may increase the reliability and strength of materials bonded to the inflatable.

Figure 4B:
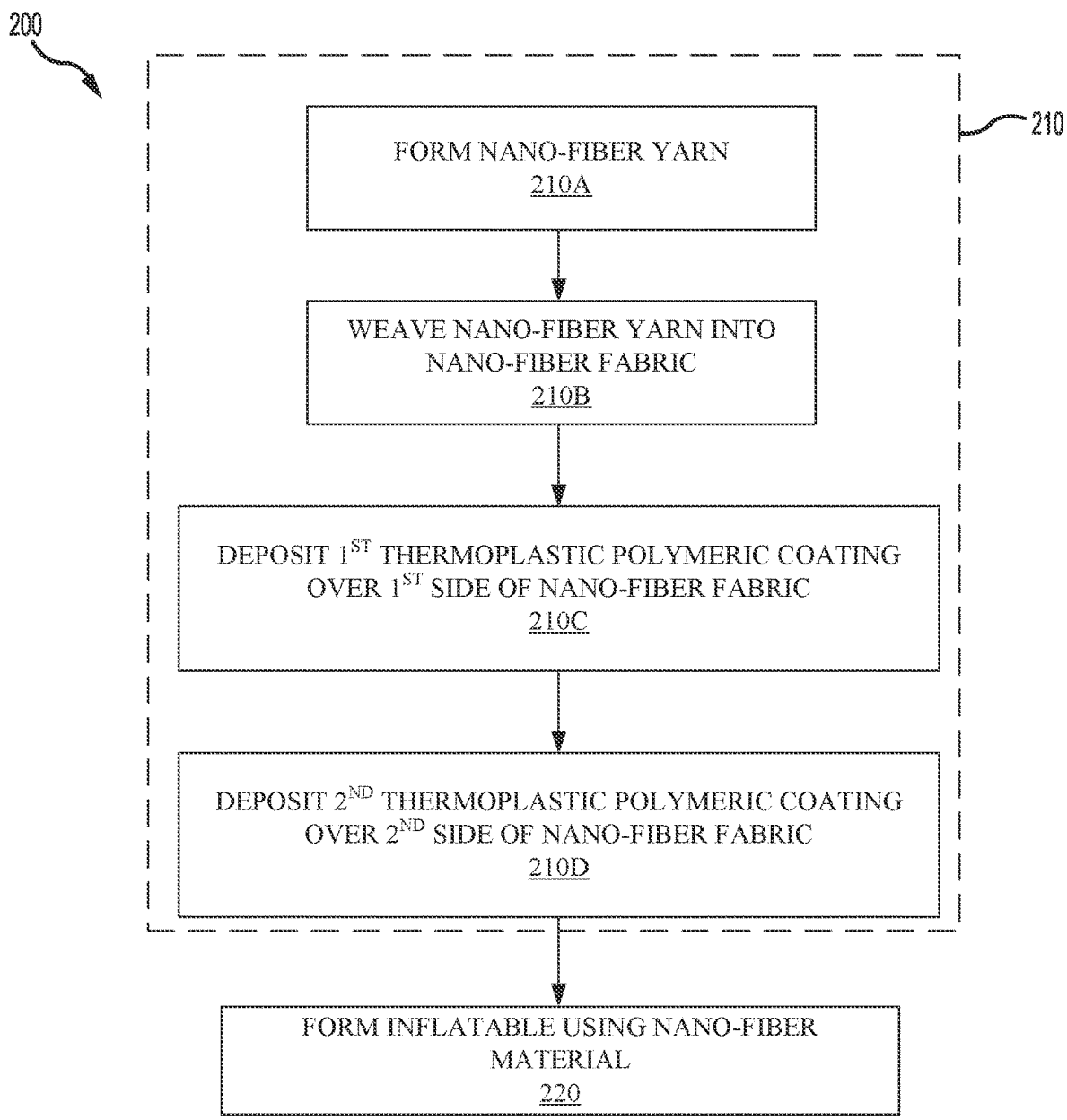

With reference to FIG. 4A, a method 200 of forming an inflatable for an evacuation system is illustrated. Method 200 may comprise forming a nano-fiber material (step 210) and forming an inflatable chamber of the inflatable using the nano-fiber material (step 220). With reference to FIG. 4B, step 210 of method 200 may include forming nano-fiber yarn (step 210A) and weaving the nano-fiber yarn to form a nano-fiber fabric (step 210B). Step 210 of may further include depositing a first thermoplastic polymeric coating over a first side of the nano-fiber fabric (step 210C) and depositing a second thermoplastic polymeric coating over a second side of the nano-fiber fabric (step 210D).

In various embodiments, step 210A may comprises forming the nano-fiber yarn including nano-sized filler particles. The nano-sized filler particles may include at least one of silica, boron nitride, boron carbide, graphene, titanium oxide, zinc oxide, or alumina particles.

In various embodiments, step 210C may comprise depositing the first thermoplastic polymeric coating such that a ratio of a thickness of the nano-fiber fabric to a thickness of the first thermoplastic polymeric coating is between 1 to 1 and 2 to 1.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nano-fiber material for an inflatable of an evacuation system, comprising:
   a nano-fiber fabric formed of a woven nano-fiber, wherein the woven nano-fiber comprises a plurality of nano-sized filler particles and wherein the plurality of nano-sized filler particles comprises at least one of silica, boron nitride, boron carbide, titanium oxide, zinc oxide, or alumina;
   an interior thermoplastic polymeric coating formed over a first side of the nano-fiber fabric; and
   an exterior thermoplastic polymeric coating formed over a second side of the nano-fiber fabric.

2. The nano-fiber material of claim 1, wherein the nano-fiber fabric is a woven fabric layer comprising at least one ply of the woven nano-fiber.

3. The nano-fiber material of claim 2, wherein the woven nano-fiber comprises at least one of a polyamide nano-fiber, a polyaramid nano-fiber, a polyurethane nano-fiber, or a polyester nano-fiber.

4. The nano-fiber material of claim 2, wherein the woven nano-fiber comprises Poly (hexamethylene adipamide) nano-fibers.

5. The nano-fiber material of claim 1, wherein the nano-fiber fabric forms between 45% and 65% of a total weight of the nano-fiber material.

6. The inflatable of claim 1, wherein the nano-fiber fabric is a woven fabric layer comprising at least one ply of the woven nano-fiber.

7. The inflatable of claim 6, wherein the nano-fiber fabric has a thickness between 75 micrometers and 100 micrometers.

8. The inflatable of claim 6, wherein a ratio of a thickness of the nano-fiber fabric to a thickness of the interior thermoplastic polymeric coating is between 1 to 1 and 2 to 1.

9. The inflatable of claim 8, wherein the nano-fiber fabric forms between 45% and 65% of a total weight of the nano-fiber material.

10. The inflatable of claim 9, wherein the interior thermoplastic polymeric coating forms between 25% and 35% of the total weight of the nano-fiber material.

11. An inflatable for an evacuation system, the inflatable comprising:
- a nano-fiber material defining an inflation chamber, wherein the nano-fiber material comprises:
  - a nano-fiber fabric comprised of a woven nano-fiber, wherein the woven nano-fiber comprises a plurality of nano-sized filler particles and wherein the plurality of nano-sized filler particles comprises at least one of silica, boron nitride, boron carbide, titanium oxide, zinc oxide, or alumina;
  - an interior thermoplastic polymeric coating formed over a first side of the nano-fiber fabric and oriented toward the inflation chamber; and
  - an exterior thermoplastic polymeric coating formed over a second side of the nano-fiber fabric and oriented away from the inflation chamber.

12. A method of forming an inflatable for an evacuation system, the method comprising:
- forming a nano-fiber material by:
  - forming nano-fibers into a nano-fiber yarn, wherein the nano-fiber comprises a plurality of nano-sized filler particles and wherein the plurality of nano-sized filler particles comprises at least one of silica, boron nitride, boron carbide, titanium oxide, zinc oxide, or alumina;
  - weaving the nano-fiber yarn to form a nano-fiber fabric;
  - depositing a first thermoplastic polymeric coating over a first side of the nano-fiber fabric; and
  - depositing a second thermoplastic polymeric coating over a second side of the nano-fiber fabric; and
- forming an inflatable chamber of the inflatable using the nano-fiber material.

13. The method of claim 12, forming the nano-fiber material further comprises depositing the first thermoplastic polymeric coating such that a ratio of a thickness of the nano-fiber fabric to a thickness of the first thermoplastic polymeric coating is between 1 to 1 and 2 to 1.

14. The method of claim 12, wherein the nano-fiber fabric forms between 45% and 65% of a total weight of the nano-fiber material.

15. The method of claim 14, wherein the interior thermoplastic polymeric coating forms between 25% and 35% of the total weight of the nano-fiber material.

\* \* \* \* \*